(12) United States Patent
Akiyama et al.

(10) Patent No.: US 6,290,792 B1
(45) Date of Patent: Sep. 18, 2001

(54) METHOD AND APPARATUS FOR PRODUCING LENS FOR VEHICULAR LAMP

(75) Inventors: Kazuo Akiyama; Fujihiko Sugiyama; Masahiko Nishizaki, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/510,343

(22) Filed: Feb. 22, 2000

(30) Foreign Application Priority Data

Feb. 22, 1999 (JP) .................................................. 11-042782

(51) Int. Cl.[7] .................................................. B29C 65/06
(52) U.S. Cl. ........................... 156/73.5; 156/292; 156/580
(58) Field of Search .................................. 156/73.5, 292, 156/308.2, 308.4, 309.6, 580; 264/68

(56) References Cited

U.S. PATENT DOCUMENTS

| 5,160,393 | * | 11/1992 | Snyder ................................ 156/73.5 |
| 5,378,951 | * | 1/1995 | Snyder ................................... 310/17 |
| 5,464,498 | * | 11/1995 | McGrath ............................ 156/580.2 |
| 5,468,336 | * | 11/1995 | Lotz et al. ......................... 156/580.2 |
| 6,033,505 | * | 3/2000 | Sugiyama et al. ................... 156/73.5 |
| 6,159,317 | * | 12/2000 | Sugiyama et al. ................... 156/73.5 |

* cited by examiner

Primary Examiner—James Sells
(74) Attorney, Agent, or Firm—Sughrue, Mion, Zinn, Macpeak & Seas, PLLC

(57) ABSTRACT

A method and apparatus for low-cost production of a lens for a vehicular lamp formed by integrally joining a plurality of synthetic resin lens members through vibration welding. The s apparatus includes a fixed portion and a vibrating portion, each have a lens fixing jig composed of a pair of respective holding jigs. The method includes the steps of supporting the respective lens members with one of the jigs, holding a lens member between a pair of holding jigs located close together, bringing each welding portion of the respective lens members into contact with each other by moving the vibrating portion and the fixed portion close together, and integrally welding the lens members by vibrating the vibrating portion.

9 Claims, 2 Drawing Sheets

METHOD AND APPARATUS FOR PRODUCING LENS FOR VEHICULAR LAMP

FIELD OF THE INVENTION

The present invention relates to a method for producing a lens for a vehicular lamp and an apparatus for producing the same. More specifically, the present invention relates to the production of a lens for a vehicular lamp which is formed by integrally joining a plurality of lens members utilizing a low-cost vibration welding technique.

BACKGROUND OF THE INVENTION

Composite lenses formed by integrally joining a plurality of lens members for a vehicular lamp have been well known. Such a composite lens is exemplified by a composite lens formed by integrally joining two lens members each of a different color, for example, red and white.

Such a composite lens has been conventionally produced by a so-called multiple-color molding technique. However, multiple-color molding requires a costly metal mold for high precision, which results in a high cost for the lens. In particular, when producing only a small quantity of such lenses, the resultant product becomes extremely costly.

In conjunction with the foregoing problem, it is an object of the present invention to provide a lens for a vehicular lamp which is formed by integrally joining a plurality of lens members utilizing a low-cost technique.

SUMMARY OF THE INVENTION

In order to solve the foregoing problem, the method for producing the lens for a vehicular lamp according to the present invention employs a vibration welding apparatus wherein a fixed portion and a vibrating portion each have a lens fixing jig composed of a pair of holding jigs, and includes the steps of holding a lens member between a pair of holding jigs located close together, bringing each welding portion of the respective lens members into contact with each other by moving the vibrating portion and the fixed portion close together, and integrally welding the lens members by vibrating the vibrating portion.

The method for producing the lens for a vehicular lamp of the present invention provides low-cost production of vehicular lamp lenses formed by integrally joining a plurality of lens members.

Further in order to solve the foregoing problem, an apparatus for producing a lens for a vehicular lamp according to the present invention includes a fixed portion and a vibrating portion arranged so as to be able to be close to or away from each other, wherein the fixed portion and the vibrating portion each have a lens fixing jig composed of a pair of holding jigs, a lens member is held between a pair of holding jigs, and the vibrating portion and the fixed portion are brought close together to cause the welding portions of the respective lens members to contact each other such that the lens members are integrally welded through vibration generated by the vibrating portion.

The apparatus for producing the lens for a vehicular lamp according to the present invention provides low-cost production of a vehicular lamp lens formed by integrally joining a plurality of lens members.

BRIEF DESCRIPTION OF THE MOVINGS

DESCRIPTION OF THE PREFERRED EMBODIMENTS

Figure 1:
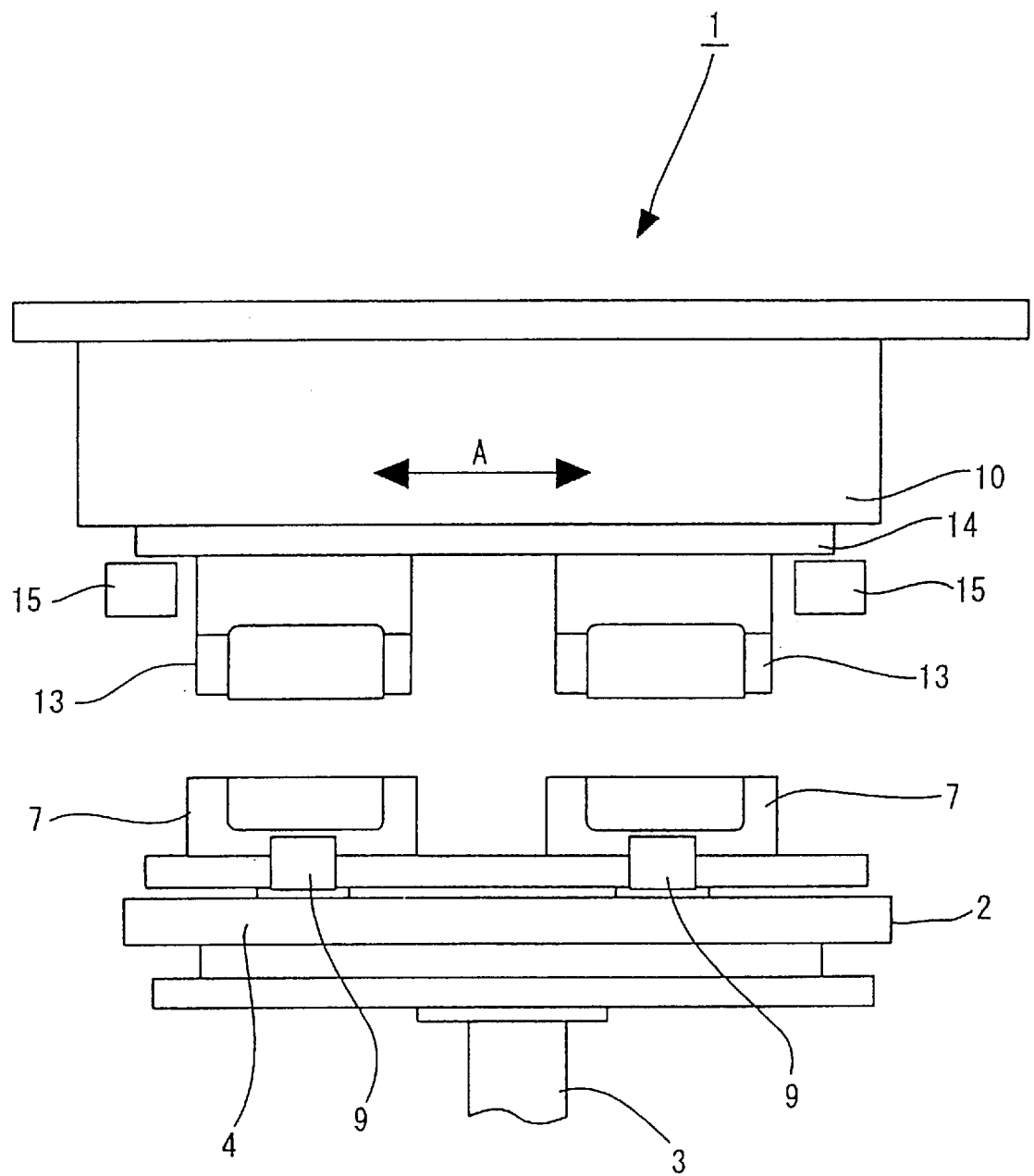
FIG. 1 is a front view schematically showing a preferred embodiment of an apparatus for producing a lens for a vehicular lamp according to the present invention.

A preferred embodiment of a method for producing a lens for a vehicular lamp and an apparatus for practicing the same in accordance with the present invention will hereinafter be described with reference to the accompanying movings.

The embodiment shown in the drawings represents the application of the present invention to a method and apparatus for producing a lens for a vehicular lamp by integrally joining two lens members.

Figure 2:
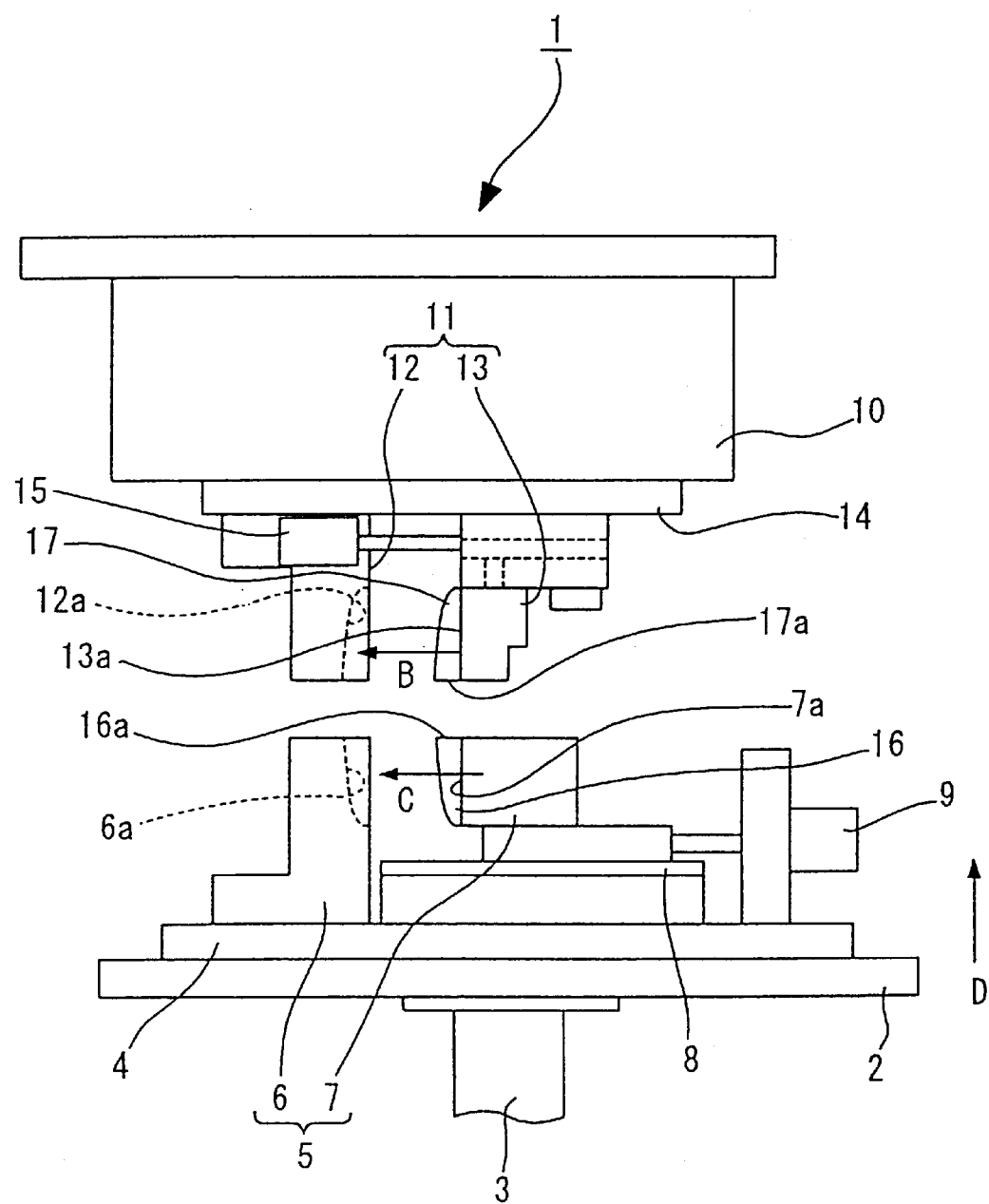
FIG. 2 is a side view of a the apparatus shown in FIG. 1.

FIGS. 1 and 2 show schematic views of an apparatus 1 for producing a lens for a vehicular lamp. The apparatus 1 is able to simultaneously produce two lenses for a vehicular lamp formed by integrally welding two lens members.

A fixed portion 2 is provided with a base 4 that can be moved vertically by a cylinder 3. Two lower jigs 5 functioning as a lens fixing jig are disposed on the base 4. Each of the lower jigs 5 is formed of a respective pair of holding jigs 6, 7. The holding jigs 6 function as fixed jigs, while movable jigs 7 are arranged so as to be movable close to or away from the respective ones of the fixed jigs 6. Rails 8 extend to the rear from the rear surfaces of the fixed jigs 6. The movable jigs 7 are supported by the rails 8 so as to be movable in the longitudinal direction. Cylinders 9 disposed to the rear of the rails 8 are provided to move the movable jigs 7 in the longitudinal direction. Lens supporting surfaces 6a, 7a are provided on the opposing surfaces of the fixed jigs 6 and movable jigs 7, respectively. Each of these lens supporting surfaces 6a, 7a are shaped to substantially match the design configuration of the lens members supported thereby. The lens supporting surfaces 6a, 7a do not have to be shaped to totally match the design configuration. At the very least, however, the end part of the welding portion, that is, of the vibrating portion, should substantially match the design configuration of the lens members.

A vibrating portion 10 is designed to be vibrated in the lateral direction by a vibration mechanism (not shown) indicated by an arrow A shown in FIG. 1.

Two upper jigs 11, each functioning as a lens fixing jig, are supported on the lower surface of a vibrating portion 10. Each of these jigs 11 is formed of a respective pair of holding jigs 12, 13. The holding jigs 12 function as the fixed jig. The movable jigs 13 are arranged so s to be movable close to or away from respective ones of the fixed jigs 12. The fixed jigs 12 are disposed at the front in a position opposing the fixed jigs 6 of the lower jigs 5. The movable jigs 13 are supported to the rear of the fixed jigs 12 by rails 14 so as to be capable of moving in the longitudinal direction. Cylinders 15 are positioned at the respective sides of the fixed jigs 12 so as to move the movable jigs 13 in the longitudinal direction. Lens supporting surfaces 12a, 13a are formed on the opposing surfaces of the fixed jigs 12 and the movable jigs 13, respectively. These lens supporting surfaces 12a, 13a are shaped to substantially match the design configuration of the lens members supported thereby. At the very least, the end part of the welding portion, that is, of the fixed portion, should substantially match the design configuration of the lens members.

The process for producing the lens for a vehicular lamp using the aforementioned apparatus 1 will be described hereinafter.

First, lens members 16 are temporarily fixed to lens support surfaces 13a of the movable jigs 13 of the upper jig 11. The aforementioned temporary fixing operation may be performed utilizing vacuum suction after positioning has been carried out using appropriate positioning pins. Then, the cylinders 15 are driven to move the movable jigs 13 forward, that is, in the direction indicated by an arrow B shown in FIG. 2, such that the lens members 16 are interposed and held between respective ones of the movable jigs 13 and the fixed jigs 12. Since, as described above, the lens support surfaces 12a, 13a of the fixed jigs 12 and the movable jigs 13 each have surfaces substantially matching the design configuration of the lens members 16, even if the lens members 16 are slightly distorted or deformed, such distortion or deformation is corrected. In particular, the configuration of the welding portions 16a is corrected.

Then, lens members 17 are temporarily fixed to the lens support surfaces 7a of the movable jigs 7 of the lower jig 5. The aforementioned temporary fixing is likewise performed by vacuum suction after positioning is carried out using appropriate positioning pins. Then the cylinders 9 are driven to move the movable jigs 7 forward, that is, in the direction indicated by an arrow C shown in FIG. 2, such that the lens members 17 are interposed and held between the movable jigs 7 and the fixed jigs 6. Again since the lens support surfaces 6a, 7a of the fixed jigs 6 and the movable jigs 7 each have surfaces substantially matching the design configuration of the lens members 17, even if the lens members 17 are slightly distorted or deformed, such distortion or deformation is corrected. In particular, since the configuration of the welding portions 17a is corrected, the welding portions 17a are bonded to the welding portions 16a of the other lens members 16 with high accuracy.

In the above-described manner, the lens members 16, 17 are supported by the upper and lower jigs 11 and 5, respectively.

The cylinder 3 is driven to move the fixed portion 2 upward, that is, in the direction indicated by an arrow D shown in FIG. 2. As a result, the welding portions 16a of the lens members 16 and welding portions 17a of the lens members 17 are brought into abutment with each other and subjected to pressure of an appropriate level.

In the above-described state, the vibrating portion 10 is vibrated in the direction indicated by the arrow A shown in FIG. 1. Accordingly, the welding portions 16a of the lens members 16 and the welding portions 17a of the lens members 17 are fused and bonded together, that is, welded. Since the vibration direction of the vibrating portion 10 (the direction indicated by the arrow A shown in FIG. 1) is defined as the direction orthogonal to the direction of holding by the holding jigs 5, 11 (the direction indicated by the arrows B and C shown in FIG. 2), the vibration is in the direction of width, not thickness, of the lens members 16, 17, thus promoting efficient welding.

Next, the cylinders 15 are driven to move the movable jigs 13 of the upper jig 11 away from the fixed jigs 12 so as to release the lens members 16.

The cylinder 3 is then further driven to move the fixed portion 2 downward, and the cylinders 9 are further driven to move the movable jigs 7 away from the fixed jigs 6 so as to release the hold on the lens members 17. The resultant lens for a vehicular lamp formed by integrally welding the lens members 16 and 17 is then extracted.

According to the inventive method for producing the lens for a vehicular lamp and the apparatus for producing the same, a composite lens is formed by integrally joining a plurality of lens members by vibration welding, thereby enabling production at a substantially lower cost compared with production by conventional multiple-color molding.

The configuration and structure of each portion in the aforementioned embodiment are only one specific example when implementing the present invention, and it is to be distinctly understood that the present invention is not limited thereto but may be otherwise variously embodied within the scope of the claims.

As is apparent from the foregoing description, the method for producing the lens for a vehicular lamp according to the present invention is characterized by using a vibration welding apparatus wherein a fixed portion and a vibrating portion each have a lens fixing jig composed of a pair of holding jigs, and comprising the steps of holding a lens member between a pair of holding jigs located close together, bringing the welding portions of the respective lens members into contact with each other by moving the vibrating portion and the fixed portion close together, and integrally welding the lens members by vibrating the vibrating portion.

The method for producing the lens for a vehicular lamp of the present invention allows low-cost production of a lens for a vehicular lamp formed by integrally joining a plurality of lens members.

Moreover, since the vibration is generated and applied in the direction orthogonal to the holding direction of the holding jig, welding can be efficiently performed.

Still further, since the pair of holding jigs preferably has surfaces that substantially match the design configuration of the lens member at least in the vicinity of the welding portion thereof, even if there is some deformation or distortion in the lens members, that deformation or distortion is corrected. As a result, the welding portions can be welded with high accuracy.

The apparatus for producing a lens for a vehicular lamp according to the present invention, which is formed by integrally joining a plurality of synthetic resin lens members through vibration welding, is characterized by including a fixed portion and a vibrating portion arranged so as to be able to be moved close to or away from each other, wherein the fixed portion and the vibrating portion each have a lens fixing jig composed of a pair of holding jigs, a lens member is held between a pair of holding jigs, and the vibrating portion and the fixed portion are brought close together to cause the welding portions of the respective lens members to contact each other such that the lens members are integrally welded through vibration generated by the vibrating portion.

The apparatus for producing a lens for a vehicular lamp according to the present invention allows low-cost production of a lens for a vehicular lamp formed by integrally joining a plurality of lens members.

Since the vibrating portion is vibrated in the direction orthogonal to the direction of holding by the holding jig, welding can be performed efficiently.

Also, since the pair of jigs have surfaces that substantially match the design configuration of the lens members at least in the vicinity of the welding portion thereof, even if there is some deformation or distortion in the lens members, the deformation and distortion is corrected. As a result, the welding portions are welded with high accuracy.

While the invention has been described in detail and with reference to specific embodiments thereof, it will be apparent to one skilled in the art that various changes and modifications can be made therein without departing from the spirit and scope thereof.

What is claimed is:

1. A method for producing a lens for a vehicular lamp by integrally joining a plurality of synthetic resin lens members through vibration welding utilizing a vibration welding apparatus comprising a fixed portion and a vibrating portion, each comprising a lens fixing jig comprising a pair of holding jigs, comprising the steps of:

holding first and second lens members close together between respective pairs of said holding jigs;

bringing portions to be welded of said first and second lens members into contact with each other by moving said vibrating portion and said fixed portion close together; and integrally welding said first and second lens members by vibrating said vibrating portion.

2. The method for producing a lens for a vehicular lamp according to claim 1, wherein vibration is generated and applied in a direction orthogonal to a holding direction of said holding jigs.

3. The method for producing a lens for a vehicular lamp according to claim 1, wherein said pair of holding jigs have surfaces that substantially match design configurations of respective ones of said first and second lens member at least in the vicinity of the respective welding portions.

4. An apparatus for producing a lens for a vehicular lamp, said lens being formed by integrally joining a plurality of synthetic resin lens members through vibration welding, comprising:

a fixed portion and a vibrating portion arranged so as to be movable close to or away from each other;

a lens fixing jig comprising a pair of holding jigs provided on each of said fixed portion and said vibrating portion, a lens member being holdable between each of said pairs of holding jigs; and a motive member for moving said vibrating portion and said fixed portion close together to cause welding portions of respective lens members to contact each other such that the lens members are integrally welded through vibration generated by the vibrating portion.

5. The apparatus for producing a lens for a vehicular lamp according to claim 4, wherein said vibrating portion is vibrated in a direction orthogonal to a direction of holding by said holding jig.

6. The apparatus for producing a lens for a vehicular lamp according to claim 5, wherein said pair of holding jigs comprise surfaces that substantially match a design configuration of respective ones of said lens members held by each of said pair of holding jigs at least in the vicinity of welding portions of said lens members.

7. The apparatus for producing a lens for a vehicular lamp according to claim 4, wherein said fixed portion comprises a base member on which a respective one of said pairs of jigs is mounted.

8. The apparatus for producing a lens for a vehicular lamp according to claim 7, wherein said motive member comprises a cylinder for raising and lowering said base member.

9. The apparatus for producing a lens for a vehicular lamp according to claim 4, further comprising a pair of rails provided on each of said fixed member and said vibrating member for slidably mounting one of said holding jigs on each of said fixed member and said vibrating member, and at least one cylinder device provided on each of said fixed member and said vibrating member for slidably moving respective ones of the slidably mounted holding jigs.

* * * * *